Patented July 28, 1942

2,291,415

UNITED STATES PATENT OFFICE 2,291,415

MANUFACTURE OF ORGANIC CONDENSATION PRODUCTS

William J. Sparks, Elizabeth, and Donald C. Field, Linden, N. J., assignors to Standard Oil Development Company, a corporation of Delaware No Drawing. Application December 12, 1940, Serial No. 369,755

7 Claims. (Cl. 260—2)

This invention relates to an improved process for carrying out reactions of the Friedel-Crafts type at low temperatures, and particularly to the use of improved catalysts in promoting such reactions.

This application is a continuation-in-part of our co-pending application Serial No. 271,960, filed May 5, 1939, for "improvements in the Manufacture of organic condensation products."

The Friedel-Crafts type of synthesis is commonly conducted at ordinary or moderately elevated temperatures with metal halide catalysts such as aluminum chloride, and is used to condense organic halides with aromatic compounds in a reaction in which hydrogen halide is formed and the organic residue is connected to the aromatic nucleus by a carbon to carbon bond. The reaction may be illustrated empirically as follows:

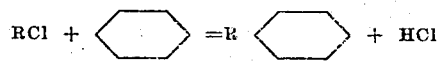

in which R represents an organic radical, and the hexagon represents an aromatic compound having a replaceable hydrogen attached to a carbon atom of the aromatic ring or nucleus. The organic halide preferably has the halogen attached to a carbon atom in an aliphatic group.

It has now been found that new and improved results are obtained by conducting such reactions at low temperatures below zero centigrade, and particularly between about 30° and 100° below zero centigrade, with metal halide catalysts which are dissolved or highly dispersed in suitable solvents or diluents such as carbon disulfide, methyl chloride, ethylene dichloride, chloroform, sulfuryl chloride (SO₂Cl₂), and the like which may act either as solvents for the catalysts or may form liquid complexes therewith. The amount of catalyst required is much less under these conditions than under the ordinary condition of the Friedel-Crafts synthesis. The progress of the reaction is much more easily controlled, and more uniform products of better color and quality are obtained. The process of this invention is also especially important in that it permits marked selectivity in the organic halides undergoing reaction, as it provides a method for reacting certain organic halides in the presence of saturated primary alkyl halides which do not enter into the condensation and polymerization reaction occurring under the condition of the process, but which act as solvents for the catalyst and the reaction products. In many cases, as will be shown below, the condensation may be conducted to yield products of very high molecular weight which are soluble in many common solvents and which have many valuable characteristics.

The organic halides suitable for use as reagents in the process of this invention are those halides which precipitate silver halide from alcoholic silver nitrate at room temperature. This test is described in "The Systematic Identification of Organic Compounds" (1935) by Shriner and Fuson, at page 23. Examples of suitable organic halide reagents are the secondary alkyl halides such as isopropyl chloride, secondary butyl chloride and the like, the tertiary alkyl halides such as tertiary butyl chloride, tertiary amyl chloride and the like, also benzyl chloride, benzoyl chloride, metallyl (isobutenyl) chloride, and acyl chloride, allyl chloride, stearyl chloride and the like.

While the process of this invention may be conducted in the presence of any of the metal halides suitable as catalysts in the Friedel-Crafts synthesis, such for example as aluminum bromide, titanium tetrachloride and the like, it has been found that aluminum chloride is especially preferred and particularly advantageous results are obtained when aluminum chloride is used in the presence of saturated primary alkyl halides, especially ethyl chloride and methyl chloride. Due to the low solubility of aluminum chloride in cold ethyl chloride, it is best to prepare the mixture of aluminum chloride in ethyl chloride at room or even somewhat higher temperatures but long storage at high temperatures is undesirable. Illustrative solubility data are given in the table below:

Solubility of aluminum chloride in ethyl chloride

| Sample | Temp. | Contact time | AlCl₃ dissolved |
|---|---|---|---|
|  | °C. | Min. | Per cent |
| Ethyl chloride and excess aluminum chloride | −78 | 60 | 0.1 |
| Do | −45 | 45 | 0.1 |
| Do | 0 | 180 | 4.4 |
| Do | +8 | 60 | 5.4 |
| Do | +12 | 180 | 7.4 |

After a substantial amount of the aluminum chloride has been dissolved, preferably up to the saturation point, the solution, if not already of the proper concentration may if desired be adjusted by dilution with further solvent and then cooled to a convenient low temperature, usually below the boiling point under atmospheric pressure of the solvent used and preferably below about −25° C. This solution is believed to be a simple solution of the aluminum chloride in the alkyl halide, in spite of the fact that solutions which are substantially saturated at room temperature do not precipitate or crystallize out the aluminum chloride when cooled to much lower temperatures and in spite of the fact that solutions of comparable concentration cannot be prepared at low temperatures. It may be that this is due to very slow solution at low temperatures in combination with a very flat solubility curve, or it may be that a supersaturated solution may be stable at such low temperatures. In any event it has not been found possible to isolate an actual complex from these solutions.

Suitable catalyst concentrations range from about 8% to about 0.5% of aluminum chloride in ethyl chloride or in methyl chloride.

The reaction temperature is preferably maintained by addition of a volatile refrigerant which is substantially inert under the conditions of the reaction and which removes heat by evaporation at about the reaction temperature desired. Normally gaseous hydrocarbons, such as ethane, ethylene, propane, butane, and mixtures thereof, are suitable. Carbon dioxide, in liquid or solid form, may also be used. The reaction may be conducted under elevated or sub-atmospheric pressure, thus controlling the boiling point of the refrigerant used.

This invention is especially suitable for preparing high molecular weight products from an organic halide and an aromatic compound, at least one of which contains another reactive group in addition to the halogen or the replaceable nuclear hydrogen indicated in the formula first given herein for the ordinary Friedel-Craft synthesis. For example, the organic halide may be also unsaturated as is the case with allyl halides; the organic halide may contain two or more halogen groups illustrated by chlorinated wax which contains alkyl dichlorides and alkyl trichlorides; the aromatic compound may have a reactive group attached to the aromatic nucleus illustrated by aralkyl halides such as benzyl chloride, and by aryl olefins such as styrene. Especially desirable products are obtained when such aralkyl compounds containing both nuclear replaceable hydrogen and an alkyl group having an olefin linkage or a halogen atom are brought into reaction with organic halides in which the halogen is connected to a secondary or tertiary carbon atom in an alkyl group. These reactions are illustrated as follows:

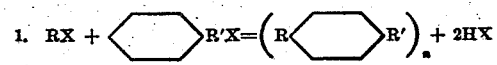

in which R and R' represent alkyl groups, X represents a halogen, and $n$ is an integer above 1 and is usually a much larger number.

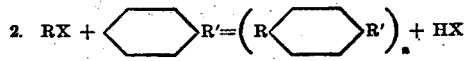

in which R represents an alkyl group, X represents a halogen, R' represents an unsaturated alkyl group, and $n$ is an integer above 1 and is usually a much larger number. When using such reagents in the process of this invention, the resulting reactions appear to involve a fargoing polymerization as well as condensation, and the resulting products range in properties from viscous liquids to solid resins.

While the above equations call for equimolal proportions of the reagents, these proportions may be varied widely in the processes described herein, for example, from about 10% to 90% (molal basis) of the organic halide based on the total mols of organic halide and aromatic reagent used, proportions ranging from 25% to 75% of the organic halide being preferred. This invention is illustrated in the following example:

*Example 1*

10 gms. monomeric styrene and 10 gms. of benzyl chloride were diluted with 40 cc. liquid propane at atmospheric pressure and treated with 25 cc. of a 2% solution of $AlCl_3$ dissolved in ethyl chloride cooled with 25 cc. of liquid propane. The reaction was vigorous with evolutions of HCl. The product was washed with alcohol and dried in a vacuum oven at 100° C. The resin formed was almost clear having a slight yellow tinge. It melted at 110° C., and was soluble in light hydrocarbons and chlorinated solvents. This resin may also be used as a substitute for polystyrene and for the uses described above for the resins.

In the above example the mixture is prepared from benzyl chloride with styrene, but it is not necessarily limited to this mixture only since similar mixtures containing benzyl or benzoyl chloride are similarly reactive. Likewise, the various homologous substances including the simple chlorobenzenes, the chloroxylenes and the chloronaphthalenes are equally usable. Similarly in place of the styrene, which is vinyl benzene, the various homologs including propenyl benzene, butenyl benzene, pentenyl benzene, hexenyl benzene, etc. may be used as well as the various olefin substitution homologs of benzene, toluene, xylene and the various naphthalenes and anthracenes.

Thus, the resins of the present invention consists in an interpolymer-condensate of an aromatic halide with an olefin substituted aromatic compound; and the polymerization-condensation procedure at low temperature by the use of a Friedel-Crafts type catalyst in solution in a low freezing solvent.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

We claim:

1. The process of preparing a high molecular weight interpolymerizate-condensate resin comprising the steps of bringing together an aralkyl chloride and an aralkyl olefin at a temperature below about 0° C. in the presence of a polymerization-condensation catalyst comprising aluminum chloride dissolved in ethyl chloride.

2. The process of preparing a high molecular weight interpolymerizate-condensate resin comprising the steps of bringing together an aralkyl chloride and styrene at a temperature below about 0° C. in the presence of a polymerization-condensation catalyst comprising aluminum chloride dissolved in ethyl chloride.

3. The process of preparing a high molecular weight interpolymerizate-condensate resin comprising the steps of bringing together benzyl chloride and an aralkyl olefin at a temperature below about 0° C. in the presence of a polymerization-condensation catalyst comprising aluminum chloride dissolved in ethyl chloride.

4. The process of preparing a high molecular weight interpolymerizate-condensate resin comprising the steps of bringing together benzal chloride and an aralkyl olefin at a temperature below about 0° C. in the presence of a polymerization-condensation catalyst comprising aluminum chloride dissolved in ethyl chloride.

5. The process of preparing a high molecular weight interpolymerizate-condensate resin comprising the steps of bringing together benzoyl chloride and an aralkyl olefin at a temperature below about 0° C. in the presence of a polymerization-condensation catalyst comprising aluminum chloride dissolved in ethyl chloride.

6. The process of preparing a high molecular weight interpolymerizate-condensate resin comprising the steps of bringing together benzyl chloride and styrene at a temperature below about 0° C. in the presence of a polymerization-condensation catalyst comprising aluminum chloride dissolved in ethyl chloride.

7. The process of preparing a high molecular weight interpolymerizate-condensate resin comprising the steps of bringing together benzal chloride and styrene at a temperature below about 0° C. in the presence of a polymerization-condensation catalyst comprising aluminum chloride dissolved in ethyl chloride.

WILLIAM J. SPARKS.
DONALD C. FIELD.